United States Patent
Piriou et al.

(10) Patent No.: US 11,453,400 B2
(45) Date of Patent: Sep. 27, 2022

(54) METHOD FOR ESTIMATING AN INDEX REPRESENTATIVE OF THE FRICTIONAL BEHAVIOR OF A VEHICLE ON A ROAD

(71) Applicant: Continental Automotive GmbH, Hannover (DE)

(72) Inventors: Simon Piriou, Toulouse (FR); Andrea Laruelo, Toulouse (FR); Anais Goursolle, Toulouse (FR)

(73) Assignee: Continental Automotive GmbH

( * ) Notice: Subject to any disclaimer, the term of this patent is extended or adjusted under 35 U.S.C. 154(b) by 211 days.

(21) Appl. No.: 16/851,642

(22) Filed: Apr. 17, 2020

(65) Prior Publication Data
US 2020/0339130 A1    Oct. 29, 2020

(30) Foreign Application Priority Data

Apr. 23, 2019  (FR) ...................................... 1904265

(51) Int. Cl.
*B60W 40/068*     (2012.01)
*B60W 40/107*     (2012.01)

(52) U.S. Cl.
CPC ........ *B60W 40/068* (2013.01); *B60W 40/107* (2013.01); *B60W 2520/26* (2013.01); *B60W 2720/106* (2013.01); *B60W 2720/30* (2013.01)

(58) Field of Classification Search
CPC ..................... B60W 2520/26; B60W 2520/263
See application file for complete search history.

(56) References Cited

U.S. PATENT DOCUMENTS

| | | | |
|---|---|---|---|
| 5,015,040 A | | 5/1991 | Lin |
| 7,751,961 B2* | | 7/2010 | Salman ................... B60T 8/172 701/80 |
| 2001/0054310 A1* | | 12/2001 | Dieckmann ........... B60C 23/061 73/146 |
| 2003/0146830 A1* | | 8/2003 | Tominaga ............. B60C 23/061 340/444 |

(Continued)

FOREIGN PATENT DOCUMENTS

| | | | | |
|---|---|---|---|---|
| EP | 1215096 A2 * | 6/2002 | ........... B60C 23/061 |
| EP | 2876413 A1 | 5/2015 | |

(Continued)

*Primary Examiner* — Aniss Chad
*Assistant Examiner* — Jennifer M Anda
(74) *Attorney, Agent, or Firm* — RatnerPrestia (57) ABSTRACT

A method for estimating a value representing the frictional behavior of a vehicle being driven on a road segment, including receiving operating parameters of a vehicle including at least, a driving wheel angular velocity, an angular velocity of a free wheel of the vehicle, and vehicle a dynamic characteristic; computing a first ratio between the driving wheel angular velocity and the angular velocity of a free wheel of the vehicle, which are acquired when the vehicle is moving substantially in a straight line at a velocity greater than or equal to a first preset threshold; determining, from the received operating parameters, a second ratio between the driving wheel radius and the free wheel radius; determining a slip rate from a product of the first and second determined ratios; and obtaining a value representing the vehicle's frictional behavior by normalizing the determined slip rate using at least the vehicle's dynamic characteristic.

12 Claims, 2 Drawing Sheets

(56) References Cited

U.S. PATENT DOCUMENTS

| | | | |
|---|---|---|---|
| 2003/0172728 A1* | 9/2003 | Gustafsson | B60T 8/1725 73/146 |
| 2004/0098187 A1* | 5/2004 | Nakao | B60T 8/172 701/80 |
| 2005/0038589 A1 | 2/2005 | Shukla | |
| 2005/0049774 A1* | 3/2005 | Kogure | B60T 8/172 701/80 |
| 2016/0282226 A1* | 9/2016 | Lavoie | G01M 17/02 |
| 2019/0100203 A1* | 4/2019 | Imamura | B60W 30/188 |

FOREIGN PATENT DOCUMENTS

| | | |
|---|---|---|
| GB | 2243657 A | 11/1991 |
| JP | 2004352166 A | 12/2004 |

\* cited by examiner

METHOD FOR ESTIMATING AN INDEX REPRESENTATIVE OF THE FRICTIONAL BEHAVIOR OF A VEHICLE ON A ROAD

CROSS REFERENCE TO RELATED APPLICATION

This application claims priority to French Application No. 1904265 dated Apr. 23, 2019, the contents of such application being incorporated by reference herein.

FIELD OF THE INVENTION

The invention in general relates to the evaluation of characteristics of contact of a vehicle with the roadway. It in particular relates to a method for estimating an index representative of the frictional behavior of a vehicle on a road.

BACKGROUND OF THE INVENTION

Tires are the only elements of contact between a vehicle and the roadway, and therefore are a preponderant factor in the dynamic behavior and safety of a vehicle. In particular, the characteristics of friction between a vehicle and the roadway are data that are key to estimating the dynamic behavior of a vehicle. Knowing the frictional behavior of a vehicle is particularly useful to improving the effectiveness of devices such as ABS (anti-lock system), ESP (electronic stability program), or even TCS (traction control system). Specifically, these systems generally operate in a predefined configuration that is not always suitable for the particular characteristics of a vehicle, of the tires with which it is equipped and of the road on which it is being driven.

Because of the relevance of this parameter, initiatives are being undertaken to construct maps of friction per road segment. Thus, a connected vehicle may obtain a frictional characteristic of the road segment on which it is being driven. However, the frictional behavior of a vehicle is not a result solely of the characteristics of the roadway, but it also depends on characteristics of the vehicle such as the type of tires with which it is equipped, their state of wear or their inflation pressure. Thus, on a given road segment, various vehicles will not benefit from the same adhesion conditions. There is therefore a need to determine the frictional behavior of a particular vehicle on a road segment.

EP 2876413 B1, incorporated herein by reference, discloses a method for comparing the frictional behavior of various vehicles. According to this method, vehicles that are spatially close to one another transmit to a server tire-road friction values. The method takes advantage of the fact that vehicles that are close to one another benefit from the same road conditions. Thus, the observed differences in friction values are attributable to the characteristics of these vehicles. However, the method of EP 2876413 B1 requires all the vehicles the frictional behavior of which it is desired to compare to implement a friction-determining algorithm. However, these algorithms are particularly complex and require additional sensors.

For this reason there is a need for a solution allowing the frictional behavior of a particular vehicle to be estimated without it being necessary to equip the latter with specific sensors or for it to implement a complex friction-computing algorithm.

SUMMARY OF THE INVENTION

To this end, an aspect of the invention relates to a method for estimating a value representative of the frictional behavior of a vehicle being driven on a road segment. The method is noteworthy in that it comprises the following steps:

receiving operating parameters of a vehicle comprising at least, a value representative of the angular velocity of a driving wheel, a value representative of the angular velocity of a free wheel of the vehicle, and a dynamic characteristic of the vehicle, computing a first ratio between the value representative of the angular velocity of a driving wheel and the value representative of the angular velocity of a free wheel of the vehicle, which values are acquired in a first time window during which the vehicle is moving substantially in a straight line at a velocity higher than a preset threshold, determining, from the received operating parameters, a second ratio between the radius of a driving wheel and the radius of a free wheel, determining a slip rate from a product of the first and second determined ratios, obtaining a value representative of the frictional behavior of the vehicle by normalizing the determined slip rate using at least the dynamic characteristic of the vehicle.

It is thus proposed to compute a ratio between the velocity of rotation of a driving wheel and of a non-driving wheel of a vehicle. The difference in velocity of rotation between a driving wheel and a free wheel of a given vehicle may be due to slip of the driving wheel on the roadway. Specifically, the engine torque transmitted to the driving wheel causes micro-slips of the wheel on the roadway. For its part, the free wheel is not affected by these micro-slips. This results in the driving wheel having a higher velocity of rotation than the free wheel. This difference in velocity depends on the friction conditions of the tire on the road.

However, a difference in radius between the wheels may also cause a difference in velocity of rotation, a wheel of small radius having an angular velocity higher than a wheel of larger radius for a given vehicle velocity. However, it is known that the tires with which the driving wheels are equipped wear more rapidly than the free wheels. Therefore, they have a tendency to have a smaller radius than the latter.

In order to isolate the influence of the micro-slips on the difference in velocity of rotation of the wheels, it is proposed to take into account a ratio between the size of the driving wheel and the size of the free wheel.

Furthermore, to exclude other factors that could be responsible for a difference in velocity of rotation between a driving wheel and a free wheel of a vehicle, the values representative of the angular velocities of the wheels are required during a movement of the vehicle that is substantially rectilinear, i.e. with no significant bend, and on a road without significant slope. Such driving conditions are frequently encountered by vehicles, this facilitating the obtainment of a value representative of the friction conditions between the vehicle and the roadway.

As a variant, the value representative of an angular velocity of a wheel may be an average of the angular velocities of the wheels belonging to a given (front or back) wheelset.

Preferably, the free wheel and driving wheel in question are positioned on the same side of a vehicle. In this way, the difference in velocity measured between the wheels does not depend on the path of the vehicle when said path is not rectilinear.

The micro-slips observed for the driving wheels furthermore depend on the velocity of movement of the vehicle. Specifically, the faster a driving wheel is rotating, the more likely it is to slip on the road. Conversely, a low velocity will give rise to less micro-slip. Thus, it is proposed to compute a ratio between the velocities of rotation of the driving wheels and of the free wheels when the velocity is higher than a preset threshold above which micro-slips are liable to occur. Tests have shown that when the velocity of the vehicle is above 35 km/h, the micro-slips are particularly representative of the friction conditions.

The slip rate determined depends on many parameters and is not constant. In order to allow a comparison between slip rates computed for various vehicles, it is proposed to normalize the slip rate determined using a dynamic characteristic of the vehicle.

In this way, the method allows the variation in the micro-slip rate under various dynamic conditions of the vehicle to be studied in order to determine, by linear regression, an index independent of these dynamic conditions.

The method thus allows a slip index to be obtained from operating parameters available in most vehicles.

The index representative of the frictional behavior determined according to the method depends on three main factors: the vehicle (tires, suspension, etc.), the road surface, and the weather. Thus, knowing an index value and two of these three factors, it is possible to infer a characteristic of the third factor. For example, with an index established under given weather conditions and for a given road segment, it is possible to compare the frictional behavior of various vehicles. According to another example, for a particular road segment and a particular vehicle, a variation in the index may be associated with a variation in the weather conditions. According to yet another example, for a vehicle and given weather conditions, a variation in the index will be characteristic of the road surface on which the vehicle is being driven.

According to one particular embodiment, the method is such that the first preset threshold is a velocity of the vehicle beyond which micro-slips of a driving wheel on the roadway are liable to occur.

Such an arrangement makes it possible to ensure that the difference in the angular velocities observed between a driving wheel and a free wheel is correlated at least to a frictional characteristic of the vehicle and of the roadway.

According to one particular embodiment, the method is such that the dynamic characteristic with which the slip rate is normalized comprises a value representative of a longitudinal acceleration and of a velocity of the vehicle.

The velocity and longitudinal acceleration, in the absence of significant bend and braking, allows the maneuver carried out in the time window in question to be characterized. It is thus possible to obtain a value representative of the frictional behavior of a vehicle that is independent of a particular maneuver of the vehicle.

According to one particular embodiment, the method is such that the dynamic characteristic used for the normalizing step comprises a torque value at the driving wheel.

The friction between the tires and the road is highly correlated with the forces applied to the driving wheels of a vehicle. It is thus possible to obtain a value representative of the frictional behavior of a vehicle that is independent of a particular force applied to the wheels of the vehicle.

According to one particular embodiment the method is such that the ratio between the radius of a driving wheel and the radius of a free wheel is obtained by computing a ratio between a value representative of the angular velocity of a driving wheel and a value representative of the angular velocity of a free wheel of the vehicle, which values are acquired in a second time window during which the vehicle is moving in a straight line at a constant velocity lower than second a preset threshold.

The slip rate of a driving wheel on the roadway is dependent on the velocity of movement of the vehicle. Thus, when the vehicle is moving at low velocity, for example a velocity lower than 30 km/h, there are no micro-slips of the driving wheel on the roadway. The difference in velocity of rotation of the wheels is then solely due to a difference in radius between the driving wheel and free wheel in question. Thus, by computing a ratio between the velocities of rotation of a driving wheel and of a free wheel at low velocity, the method allows a ratio between the radius of a driving wheel and the radius of a free wheel to be obtained.

In one particular embodiment, the second preset threshold is a velocity of the vehicle below which micro-slips between of a driving wheel on the roadway are liable to not occur.

The second preset threshold here corresponds to a velocity at which the micro-slips between a driving wheel and the road are zero or negligible. Tests have shown that at a vehicle velocity below 30 km/h the micro-slips between the tire and the roadway are zero or negligible.

Thus, under such conditions, the differences in velocities observed between a driving wheel and a free wheel of a vehicle can be due only to a difference in the radius of the wheels.

According to one particular embodiment, the method is such that the ratio between the radius of a driving wheel and the radius of a free wheel is obtained by:

computing a first ratio between a value representative of the angular velocity of a driving wheel and a value representative of the angular velocity of a free wheel of the vehicle, which values are acquired when the vehicle is being driven at a first velocity, computing at least one second ratio between a value representative of the angular velocity of a driving wheel and a value representative of the angular velocity of a free wheel of the vehicle, which values are acquired when the vehicle is being driven at a second velocity, and obtaining a ratio between the driving-wheel radius and the free-wheel radius by determining the ordinate at the origin of a straight line obtained by linear regression from the first and at least one second computed ratios.

The difference in velocity of rotation of a driving wheel and of a free wheel of a vehicle is due to the difference in radius of the wheels, and to the micro-slips between the driving wheel and the roadway. The impact of the difference in radius of the wheels is constant, whereas the part due to the micro-slips varies depending on the velocity of the vehicle. Thus, at low velocity, the part of the micro-slips in the observed difference in velocity is zero or negligible. On the basis of a computation of ratio of velocity of rotation between a driving wheel and a free wheel for various velocities of the vehicle, the server estimates the ratio of velocity of rotation of a driving wheel and of a free wheel at low velocity, at which velocity the impact of the micro-slips is negligible.

Such an arrangement allows the ratio of the radius of the wheels to be estimated under driving conditions that are frequently encountered.

In one particular embodiment, the values representative of the angular velocity of a wheel are signals relative to the position of an encoder wheel of an ABS sensor.

Most vehicles on the road are equipped with an ABS sensor allowing a velocity of rotation of the wheels to be obtained. To do this, ABS systems employ an encoder wheel or a notched wheel and a sensor configured to generate pulses when the wheel is rotating. The number of pulses per second is representative of the angular velocity of the wheel. It is advantageous to use such a signal, because it is conventionally available on the communication buses of vehicles, and it is a signal that is generally less filtered than other signals such as the number of revolutions per minute (rpm). Precision is therefore improved.

According to another aspect, the invention relates to a device for estimating a value representative of the frictional behavior of a vehicle being driven on a road network, the device comprising a memory and a processor that is configured by instructions that are stored in the memory and that are configured to implement steps of:

- receiving operating parameters of a vehicle comprising at least, a value representative of the angular velocity of a driving wheel, a value representative of the angular velocity of a free wheel of the vehicle, and a dynamic characteristic of the vehicle,
- computing a first ratio between the value representative of the angular velocity of the driving wheel and value representative of the angular velocity of a free wheel of the vehicle, which values are acquired in a first time window during which the vehicle is moving in a straight line at a velocity higher than a preset threshold,
- determining, from the received operating parameters, a second ratio between the radius of the driving wheel and the radius of the free wheel,
- determining a slip rate from a product of the first and second determined ratios, and
- obtaining a value representative of the frictional behavior of the vehicle by normalizing the determined slip rate using at least one dynamic characteristic of the vehicle, which is acquired in a second time window.

An aspect of the invention also relates to a server comprising an estimating device such as described above.

According to yet another aspect, the invention relates to a data medium containing computer-program instructions configured to implement the steps of an estimating method such as described above, when the instructions are executed by a processor.

The data medium may be a nonvolatile data medium such as a hard disk, a flash memory or an optical disk for example.

The data medium may be any entity or device capable of storing instructions. For example, the medium may comprise a storing means, such as a ROM, RAM, PROM, EPROM, a CD ROM or even a magnetic storing means, a hard disk for example.

Furthermore, the data medium may be a transmissible medium such as an electrical or optical signal, which may be transmitted via an electrical or optical cable, via radio or via other means.

Alternatively, the data medium may be an integrated circuit into which the program is incorporated, the circuit being suitable for executing or for being used in the execution of the method in question.

The various aforementioned embodiments and features may be added independently or in combination to one another, to the steps of the synchronizing method. The servers, terminals and devices have at least advantages analogous to those conferred by the method to which they relate.

BRIEF DESCRIPTION OF THE DRAWINGS

Other features and advantages of aspect of the invention will become more apparent upon reading the description that will follow. This description is purely illustrative and should be read with reference to the appended drawings, in which.

DETAILED DESCRIPTION OF THE PREFERRED EMBODIMENTS

Figure 1:
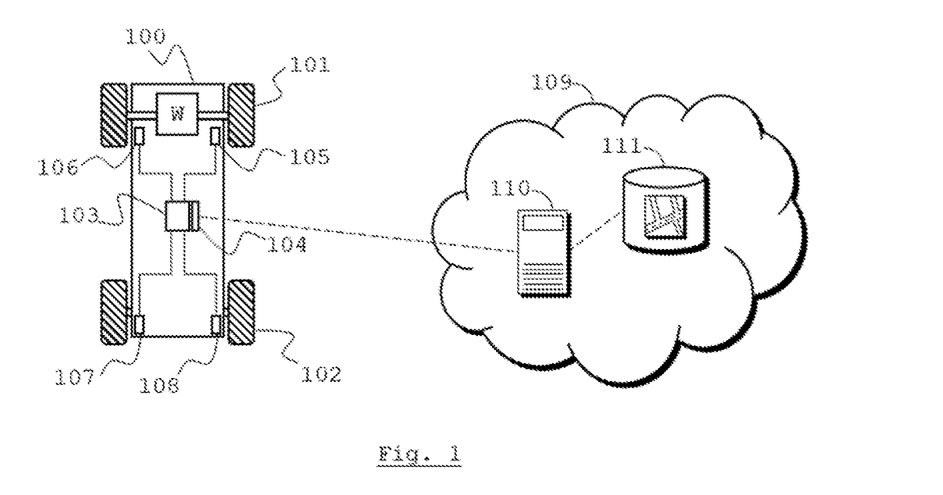
FIG. 1 shows an environment suitable for implementation of the method in question according to one particular embodiment.

FIG. 1 shows a road vehicle 100 equipped with an engine W. The vehicle 100 comprises a driving front wheelset composed of two driving wheels 101 and a rear non-driving wheelset composed of two free wheels 102.

The vehicle 100 comprises a computer 103 to which four sensors of velocity of rotation of the wheels 105 to 108 are connected. The sensors 105 to 108 are for example sensors of velocity of rotation of the wheels of an ABS system. Conventionally, such a sensor of velocity of rotation is composed of a toothed disk connected to the wheel hub or to the drive shaft, and of a sensor configured to detect the passage of a tooth of the disk when the latter starts moving. Thus, when the wheels of the vehicle 100 are rotating, the sensors 105 to 108 generate pulses intended for the computer 103, the frequency of which is proportional to the velocity of rotation of the wheel with which they are associated. From the frequency of the pulses and the number of teeth of the toothed wheel, it is possible to determine the velocity of rotation in revolutions per minute of the various wheels of the vehicle.

The computer 103 is for example an electronic control unit (ECU) configured to receive, via a communication bus, signals originating from sensors such as the sensors 105 to 108. The computer 103 may furthermore receive information originating from other sensors, such as for example sensors of engine torque, acceleration sensors, sensors of braking force, of steering angle, etc.

The vehicle 100 furthermore comprises a communication interface 104 allowing it for example to connect to a 3G, 4G or 5G cellular access network or even a Wi-Fi or WiMAX network with a view to exchanging information with other devices. Thus, the communication interface 104 allows the vehicle 100 to exchange messages with a server 110 of a communication network 109. In particular, the communication interface 104 allows the vehicle to transmit, to the server 110, values representative of the velocity of rotation of each of the wheels of the vehicle, for example the frequency of the pulses generated by the sensors of velocities of rotation 105 to 108.

The server 110 is suitable for receiving and processing information originating from vehicles such as the vehicle 100. In particular, the server may receive operating parameters of the vehicle 100 on the basis of which parameters it implements the method in question according to one particular embodiment.

Figure 2:
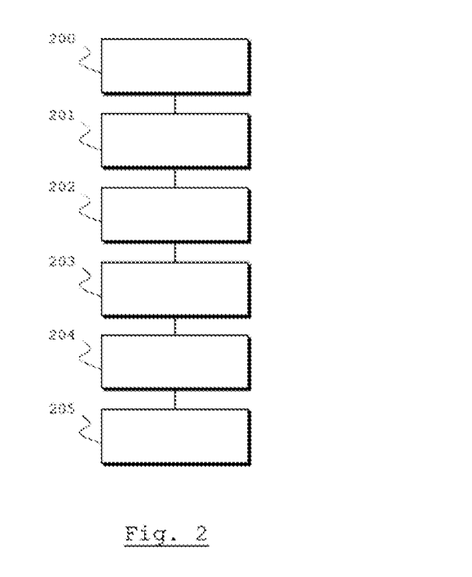
FIG. 2 illustrates the main steps of the estimating method according to one particular embodiment.

The method will now be described with reference to FIG. 2 in one particular embodiment.

In a first step 200, the server receives operating parameters sent by the vehicle 100. The received operating parameters comprise at least a value representative of the angular velocity of a driving wheel 101 and a value representative of the angular velocity of a free wheel 102 of the vehicle. As was seen above, these values may be transmitted in the form of a signal containing pulses the frequency of which depends on the velocity of rotation of the wheels, or indeed in the form of a number of revolutions per minute, or in any other desirable form. Preferably, the received signal corresponds to values conventionally exchanged on the communication bus of the vehicle.

According to one particular embodiment, the server receives operating parameters the acquisition of which is carried out in a first time window during which the vehicle 100 is driving in a straight line at a relatively high constant velocity, for example one higher than 35 km/h.

Figure 3:
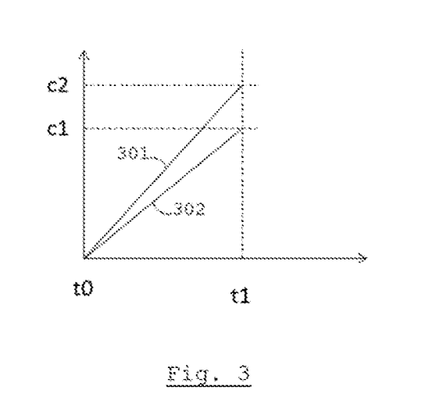
FIG. 3 is a graph showing differences in velocities of rotation between a driving wheel and a free wheel of a vehicle.

The schematic of FIG. 3 is a Cartesian coordinate system in which time is represented on the x-axis and the number of pulses detected by a sensor of velocity of wheel rotation is represented on the y-axis. The straight line 301 corresponds to the data acquired by the sensor of velocity of rotation of the driving wheel 101 of the vehicle 100, and the straight line 302 corresponds to the data acquired by the sensor of velocity of rotation of the free wheel 102 of the vehicle 100, when the vehicle is moving in a straight line at a velocity above 35 km/h. It may be seen that at the time t1, the number of pulses c2 detected for the driving wheel is higher than the number of pulses c1 detected for the free wheel 102.

Specifically, when the vehicle 100 is moving in a straight line, at a velocity higher than a preset threshold, for example 35 km/h, the driving wheels rotate faster than the free wheels. This difference is in part due to micro-slips of the driving wheel, which are occasioned by the transmission of the engine torque to the wheel. The amplitude of the micro-slips to which a driving wheel is subject depends on the friction conditions between the driving wheel and the roadway.

In a step 201, the server computes a first ratio between the value representative of the angular velocity of the driving wheel and value representative of the angular velocity of a free wheel of the vehicle. To do this, the server determines a number of pulses detected by the sensor of velocity of a driving wheel over a given period, for example over a period of at least 2 seconds, and the number of pulses detected by the sensor of the free wheel 102 over the same period. The ratio between the number of pulses counted for the driving wheel and the number of pulses counted for the free wheel being related to a slip rate of the driving wheel, the server thus determines a value representative of the adhesion of the vehicle to the road.

However, the observed difference in velocity of rotation may also be due to other factors. In particular, the origin of a difference in velocity of rotation between a driving wheel and a free wheel of a moving vehicle may be a difference in radius between the driving wheel and the free wheel. Specifically, a wheel of small radius will necessarily rotate faster than a wheel of larger radius to travel the same distance. Furthermore, the wear of the tires, or a difference in inflation pressure, modifies the radius of a wheel. Thus, it is necessary to take into account a possible difference in radius between the driving wheel 101 and the free wheel 102 to obtain a value that is solely representative of the friction conditions of the tires with the roadway. In other words:

$$\text{wheelTicks}_{DW} = \text{wheelTicks}_{FW} * \text{wheelRadius}_{Ratio} * (1 + \mu s_{Ratio})$$

where:
  $\text{wheelTicks}_{DW}$ is the number of pulses measured by the sensor of driving-wheel velocity over a given interval,
  $\text{wheelTicks}_{FW}$ is the number of pulses measured by the sensor of free-wheel velocity over a given interval,
  $\text{wheelRadius}_{Ratio}$ is the ratio between the radius of the driving wheel and the radius of the free wheel, and
  $\mu s_{Ratio}$ is the slip rate of the driving wheel.

To this end, it is proposed to determine, in step 202, a ratio between the radius of the driving wheel 101 and the radius of the free wheel 102 of the vehicle 100. To do this, the vehicle may transmit, to the server, the nominal radius of the wheels with which it is equipped. However, the diameter of the wheels is not always known, in particular because the wear and inflation pressure of the tires cannot always be determined with precision. Therefore, it is proposed, according to one particular embodiment, to compute a ratio between the radius of a driving wheel and the radius of a free wheel without knowing the nominal values thereof.

To do this, the server receives operating parameters of the vehicle 100 the acquisition of which is carried out in a second time window during which the vehicle 100 is being driven in a straight line at a constant velocity below a preset threshold below which the micro-slips between the tire of a driving wheel and the roadway are zero or negligible. Such a threshold generally corresponds to a relatively low velocity. Tests have shown that at a vehicle velocity below 30 km/h the micro-slips are negligible. As was seen above, the amplitude of the micro-slips observed for the driving wheels of a vehicle depend on the velocity of movement of the vehicle. Thus, at low velocity, the driving wheels are not subject to micro-slips, or else the latter are negligible. Under these conditions, the difference between the velocity of rotation of a driving wheel and the velocity of rotation of a free wheel of a vehicle being driven at constant velocity in a line is due to a difference in the radius of the wheels. Therefore, again under these conditions, the ratio between the velocity of rotation of a driving wheel and the velocity of rotation of a free wheel of a vehicle is equal to the ratio between the radius of the driving wheel and the radius of the free wheel.

In another embodiment, the ratio between the radius of a driving wheel and the radius of a free wheel is obtained by:
  computing a first ratio between a value representative of the angular velocity of a driving wheel and a value representative of the angular velocity of a free wheel of the vehicle, which values are acquired when the vehicle is being driven at a first velocity,
  computing at least one second ratio between a value representative of the angular velocity of a driving wheel and a value representative of the angular velocity of a free wheel of the vehicle, which values are acquired when the vehicle is being driven at a second velocity, and
  obtaining a ratio between the driving-wheel radius and the free-wheel radius by determining the ordinate at the origin of a straight line obtained by linear regression from the first and at least one second computed ratios.

On the basis of a computation of ratio of velocity of rotation between a driving wheel and a free wheel for various velocities of the vehicle, the server estimates the ratio of velocity of rotation of a driving wheel and of a free wheel at low velocity, at which velocity the impact of the micro-slips is negligible. To do this, the server determines the ordinate at the origin of a straight regression line computed in a coordinate system in which points of coordinates $(V_i, R_i)$, with $V_i$ the velocity of the vehicle and $R_i$ the ratio of velocity of rotation of a driving wheel and of a free wheel of the vehicle, are placed.

In step 203, the server 103 determines a slip rate of the driving wheel. To do this, the server computes a product of the ratio computed in step 201 and of the ratio computed in step 202 using the following formula:

$$\mu s_{ratio} = \frac{wheelTicks_{DW}}{wheelTicks_{FW}} * wheelRadius_{ratio} - 1$$

In which:
$\mu s_{Ratio}$ is the slip rate of the driving wheel,
wheelTicks$_{DW}$ is the number of pulses measured by the sensor of driving-wheel velocity over a given interval,
wheelTicks$_{FW}$ is the number of pulses measured by the sensor of free-wheel velocity over a given interval, and
wheelRadius$_{Ratio}$ is the ratio between the radius of the driving wheel and the radius of the free wheel.

The method thus allows the server to determine a slip rate for the vehicle 100. This slip rate is noteworthy in that it is representative of the friction conditions of the tires of the vehicle 100 with the roadway. However, the determined slip rate still depends on factors specific to the vehicle 100. It cannot therefore be used as point of comparison with other vehicles.

In order to allow a comparison between the slip rates computed for various vehicles, or even to compare frictions observed during different maneuvers, it is proposed, in a step 204, to normalize the slip rate determined in step 203 using a linear regression between the determined slip rate and a dynamic characteristic of the vehicle. The method thus allows a micro-slip index suitable for carrying out comparisons with micro-slip indices estimated for other vehicles to be obtained.

The normalizing characteristic is estimated from one or more parameters among the following operating parameters:
longitudinal acceleration of the vehicle,
velocity of the vehicle,
velocity of rotation of the wheels,
torque transmitted to the wheels,
engine torque,
drive torque,
engine rotation speed,
engaged gearbox ratio,
gear reduction ratios of the gearbox.

According to one particular embodiment, the micro-slip rate is normalized using the longitudinal acceleration of the vehicle and its velocity, according to the following linear model:

$$\mu s_{ratio} = \mu s_{index} * a_x + B * v_x^2 + C$$

where:
$\mu s_{Ratio}$ is the micro-slip rate for the vehicle in question,
$a_x$ is the longitudinal acceleration of the vehicle,
$v_x$ is the velocity of the vehicle,
the normalized micro-slip rate $\mu s_{Index}$ and the values B and C being estimated by linear regression. These values are for example fitted using the least-squares method.

According to one particular embodiment, the micro-slip rate is normalized using the driving force (torque delivered to the wheels) of the vehicle, according to the following linear model:

$$\mu s_{ratio} = \mu s_{index} * F_{powertrain} + B$$

In which:

$$F_{powertrain} = \frac{Torque_{powertrain}}{WheelRadius_{DW}}$$

With:
Torque$_{Powertrain}$ the drive torque, and
WheelRadius$_{DW}$ the radius of the driving wheel.

Employing a fitting method such as for example the least-squares method, it is possible to determine a normalized micro-slip rate $\mu s_{Index}$.

The micro-slip index thus obtained may be used to compare vehicles being driven on a given road segment under the same meteorological conditions. It is thus possible to infer the frictional behavior of a vehicle in order to perform classifications of vehicles depending on their dynamic performance.

The method that has been described is particularly advantageous with respect to the prior art because the micro-slip index is determined from data commonly available on the CAN bus of most vehicles. It does not require dedicated sensors to be employed.

The index is estimated in a time window corresponding to a substantially rectilinear movement of the vehicle. It is a question of common driving conditions that a vehicle very often encounters. In contrast, the prior-art techniques, which were based on particular sensors and/or complex algorithms for determining friction, are able to estimate friction only during particular maneuvers, such as for example abrupt braking or bends taken with a particular velocity and/or angle.

According to one particular embodiment, the micro-slip index is used, in a step 205, to complete maps associating friction values with segments, such as in the map database 111 of FIG. 1. Such maps are drawn from friction measurements carried out by a fleet of vehicles equipped with sensors configured to estimate a friction characteristic for a road segment. However, these vehicles are few in number and are unable to travel the road segments of a region exhaustively. Furthermore, the characteristics of a road segment vary over time, and hence a measurement carried out at a given time may no longer be representative of the friction characteristics of the roadway after a certain time. According to one particular embodiment, the server 110 updates a map comprising friction values per road segment by implementing the following steps:
determining a first micro-slip index for a given first road segment for which a coefficient of friction is known. The coefficient may for example have been measured beforehand by a measuring system comprising dedicated sensors.
determining a second micro-slip index for a second road segment, and
when the first micro-slip index is substantially equal to the second micro-slip index, assigning a coefficient of friction to the second road segment of value equal to the coefficient of friction associated with the first road segment.

Specifically, when a micro-slip index is the same in different locations on the road network, for similar meteorological conditions, it is possible to extrapolate that the coefficient of friction is the same in these locations. The micro-slip index thus advantageously allows a map of friction characteristics to be completed without significantly increasing the fleet of measuring vehicles.

According to one particular embodiment, the micro-slip index is used, in step 205, to estimate the surface conditions of a road on which the vehicle 100 or a group of similar vehicles is being driven when the characteristics of the vehicle or of the group are known. The index determined using the method in question reflects both the characteristics of the vehicle (dynamic characteristics and tires) and the surface conditions of the roadway. Thus, when the characteristics specific to the vehicle and weather are known, it is possible to infer the surface conditions. To do this, the server 110 may implement the following steps:

- determining, in a first time window, a first micro-slip index for a road segment,
- determining, in a second time window different from the first time window, a second micro-slip index for the road segment, and
- identifying a change in the surface conditions of the road segment when the first index is different from the first index.

In one particular embodiment, the determined micro-slip index is used in step 205 to monitor the state of wear of the tires with which a vehicle is equipped. To do this, it is proposed to form a group of vehicles having a similar micro-slip index determined for road segments having a given friction characteristic and similar meteorological conditions. These data may be obtained participatively, i.e. transmitted by vehicles to a server. The server may then compare to one another the micro-slip indices determined for the vehicles of the group so as to detect a potential divergence in the index of a vehicle under constant road conditions. A divergence in the index of a vehicle with respect to the group, under constant meteorological and road conditions, then being characteristic of a modification of the adhesion conditions of the tires with which this vehicle is equipped. The server may then notify the vehicle in order to incite its owner to check the state of wear and/or the inflation pressure of the tires.

Figure 4:
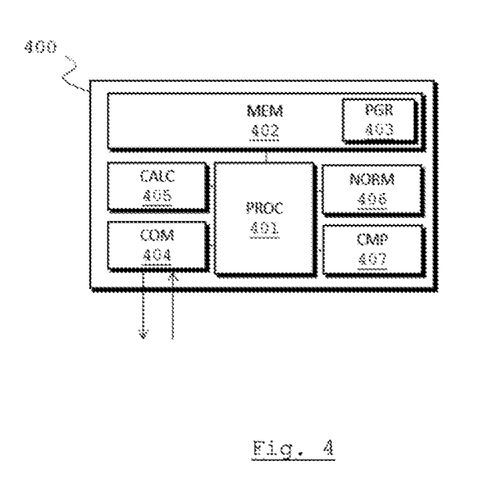
FIG. 4 shows the architecture of a device suitable for implementing the method according to one particular embodiment.

FIG. 4 shows the architecture of a device 400 suitable for implementing the estimating method according to one particular embodiment.

The device 400 comprises a storage space 402, for example a memory MEM, and a processing unit 401 that is for example equipped with a processor PROC. The processing unit may be controlled by a program 403, for example a computer program PGR, implementing the estimating method such as described in an aspect of the invention with reference to FIG. 2, and in particular steps of:

- receiving operating parameters of a vehicle comprising at least, a value representative of the angular velocity of a driving wheel and a value representative of the angular velocity of a free wheel of the vehicle,
- computing a first ratio between the value representative of the angular velocity of the driving wheel and value representative of the angular velocity of a free wheel of the vehicle, which values are required when the vehicle is moving in a straight line at a velocity higher than a preset threshold beyond which micro-slips are liable to occur between the tires of the driving wheels and the road,
- determining, from the received operating parameters, a second ratio between the radius of the driving wheel and the radius of the free wheel,
- determining a slip rate from a product of the first and second determined ratios, and
- obtaining a value representative of the frictional behavior of the vehicle by normalizing the determined slip rate using at least one dynamic characteristic of the vehicle.

On initialization, the instructions of the computer program 403 are for example loaded into a RAM (random access memory) before being executed by the processor of the processing unit 401. The processor of the processing unit 401 implements the steps of the estimating method according to the instructions of the computer program 403.

To do this, the device 400 comprises, in addition to the memory 402, communication means 404 (COM) allowing the device to connect to a telecommunication network and to exchange data with other devices via the telecommunication network, and in particular to receive operating parameters of a vehicle comprising at least a value representative of the angular velocity of a driving wheel and a value representative of the angular velocity of a free wheel of the vehicle. The angular velocities may be received in the form of CAN signals containing a number of pulses generated by an encoder wheel per unit time, or even a number of revolutions per minute, or any other value suitable for determining a velocity of rotation of the wheels in question. The communication interface is for example an interface for access to a 3G, 4G or 5G cellular network, or even a Wi-Fi or WiMAX interface. Such an interface may employ a TCP/IP or V2X communication protocol to transmit data.

The device furthermore comprises a computing module 405 (CALC) configured by computer-program instructions to compute a first ratio between the received value representative of the angular velocity of the driving wheel and received value representative of the angular velocity of a free wheel of the vehicle, the values having been acquired by a vehicle moving in a straight line at a velocity higher than a preset threshold beyond which micro-slips are liable to occur between the tire of a driving wheel and the roadway. Such a threshold is for example a velocity of 35 km/h.

The computing module 405 is furthermore configured by instructions to determine a ratio between the radius of the driving wheel and the radius of the free wheel for which angular velocities were received by the communication module 404. Such a radius ratio may be obtained directly via a datum transmitted by the vehicle. According to one particular embodiment, the radius ratio is determined by the computing module 405 by computing a ratio between the value representative of the angular velocity of the driving wheel and value representative of the angular velocity of a free wheel of the vehicle, which values are acquired in a time window during which the vehicle is moving in a straight line at a constant velocity lower than a preset threshold below which the micro-slips between a driving wheel and the roadway are zero or negligible, or are liable not to occur, for example at lower than a velocity of 30 km/h. The computing module 405 then determines a slip rate by computing a product of the first and second determined ratios.

The device 400 also comprises a normalizing module 406, which is configured to normalize the slip rate determined by the computing module 405. The normalizing module 406 is implemented via computer-program instructions configured to determine, from at least one dynamic characteristic of the vehicle, such as the longitudinal acceleration of the vehicle and its velocity, parameters of a normalizing function. To do this, the instructions are for example configured to implement a linear regression based on a set of values of micro-slip rate that are associated with accelerations and velocities of the vehicle. The module 406 thus allows the device to determine a micro-slip index suitable for making inter-vehicle comparisons.

Lastly, the device 400 comprises a comparing module 407 configured to compare a micro-slip index normalized by the module 406 with a friction value associated with a road segment on which the vehicle is being driven, and/or with a micro-slip index determined for another vehicle.

According to one particular embodiment, the device 400 is comprised in a server of a communication network.

The invention claimed is:

1. A method for estimating a value representative of a frictional behavior of a vehicle being driven on a road segment, the method comprising:
   receiving, by a processor, operating parameters of a vehicle comprising at least, a value representative of an angular velocity of a driving wheel, a value representative of an angular velocity of a free wheel of the vehicle, and a dynamic characteristic of the vehicle;
   computing, by the processor, a first ratio between the value representative of the angular velocity of the driving wheel and the value representative of the angular velocity of the free wheel of the vehicle, which are acquired in a first time window during which the vehicle is moving substantially in a straight line at a first velocity in which micro-slips of a driving wheel on a roadway are liable to occur;
   computing, by the processor, a second ratio between the value representative of the angular velocity of the driving wheel and the value representative of the angular velocity of the free wheel of the vehicle, which are acquired in a second time window during which the vehicle is moving in a substantially straight line at a second velocity of the vehicle in which micro-slips of the driving wheel on the roadway are liable to not occur;
   determining, by the processor, a third ratio between the radius of the driving wheel and the radius of the free wheel based on the first ratio and the second ratio;
   determining, by the processor, a slip rate from a product of the third ratio and a fourth ratio between the value representative of the angular velocity of the driving wheel and the value representative of the angular velocity of the free wheel;
      estimating, by the processor, the value representative of the frictional behavior of the vahicle by normlizing the determined slip rate using at least the dynamic characteristic of the vehicle; and
   automatically controlling, by the processor, an operation of the vahicle based on the estimated value representative of the frictional behavior of the vehicle.

2. The method as claimed in claim 1, wherein the first preset threshold is a velocity of the vehicle beyond which micro-slips of the driving wheel on the roadway are liable to occur.

3. The method as claimed in claim 2, wherein the dynamic characteristic with which the slip rate is normalized comprises a value representative of a longitudinal acceleration and of the velocity of the vehicle.

4. The method as claimed in claim 2, wherein the dynamic characteristic with which the slip rate is normalized comprises a torque value at the driving wheel.

5. The method as claimed in claim 1, wherein the dynamic characteristic with which the slip rate is normalized comprises a value representative of a longitudinal acceleration and of the velocity of the vehicle.

6. The method as claimed in claim 1, wherein the dynamic characteristic with which the slip rate is normalized comprises a torque value at the driving wheel.

7. The method as claimed in claim 1, wherein the ratio between the radius of the driving wheel and the radius of the free wheel is obtained by computing a the ratio between a value representative of the angular velocity of the driving wheel and a value representative of the angular velocity of the free wheel of the vehicle, which are acquired in a second time window when during which the vehicle is moving in a straight line at a constant velocity lower than a second preset threshold.

8. The method as claimed in claim 7, wherein the second preset threshold is a threshold velocity of the vehicle below which micro-slips between of the driving wheel on the roadway are liable to not occur.

9. The method as claimed in claim 1, wherein the ratio between the radius of the driving wheel and the radius of the free wheel is obtained by:
   computing the first ratio between a value representative of the angular velocity of the driving wheel and a value representative of the angular velocity of the free wheel of the vehicle, which are acquired when the vehicle is being driven at a first velocity,
   computing the second ratio between a value representative of the angular velocity of the driving wheel and a value representative of the angular velocity of the free wheel of the vehicle, which are acquired when the vehicle is being driven at a second velocity, and
   obtaining the ratio between the driving-wheel radius and the free-wheel radius by determining an ordinate at an origin of a straight line obtained by linear regression from the first and at least one second computed ratios.

10. The method as claimed in claim 1, wherein the values representative of the angular velocity of the free wheel and the drive wheel are signals relative to a position of an encoder wheel of an ABS sensor.

11. A device for estimating a value representative of a frictional behavior of a vehicle being driven on a road segment, the device comprising:
   a memory; and
   a processor that is configured by instructions that are stored in the memory and that are configured to implement:
      receiving operating parameters of a vehicle comprising at least, a value representative of an angular velocity of a driving wheel, a value representative of an angular velocity of a free wheel of the vehicle, and a dynamic characteristic of the vehicle,
      computing a first ratio between the value representative of the angular velocity of the driving wheel and the value representative of the angular velocity of the free wheel of the vehicle, which are acquired in a first time window during which the vehicle is moving in a straight line at a first velocity in which micro-slips of a driving wheel on the roadway are liable to occur,
      computing a second ratio between the value representative of the angular velocity of the driving wheel and the value representative of the angular velocity of the free wheel of the vehicle, which are acquired in a second time window during which the vehicle is moving in a substantially straight line at a second velocity of the vehicle in which micro-slips of the driving wheel on the roadway are liable to not occur,
      determining a third ratio between the radius of the driving wheel and the radius of the free wheel based on the first ratio and the second ratio,
      determining a slip rate from a product of the third ratio and a fourth ratio between the value representative of the angular velocity of the driving wheel and the value representative of the angular velocity of the free wheel, estimating the value representative of the frictional behavior of the vehicle by normalizing the determined slip rate using at least the dynamic characteristic of the vehicle, and automatically controlling an operation of the vehicle based on the estimated value representative of the frictional behavior of the vehicle.

12. A server comprising a device as claimed in claim 11.

* * * * *